United States Patent
Renert et al.

(10) Patent No.: US 7,290,282 B1
(45) Date of Patent: Oct. 30, 2007

(54) REDUCING FALSE POSITIVE COMPUTER VIRUS DETECTIONS

(75) Inventors: Charles Renert, Santa Monica, CA (US); Carey S Nachenberg, Northridge, CA (US)

(73) Assignee: Symantec Corporation, Cupertino, CA (US)

( * ) Notice: Subject to any disclaimer, the term of this patent is extended or adjusted under 35 U.S.C. 154(b) by 875 days.

(21) Appl. No.: 10/118,703

(22) Filed: Apr. 8, 2002

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. .................... 726/24; 726/22; 726/23; 726/25

(58) Field of Classification Search ............ 713/201, 713/24
See application file for complete search history.

(56) References Cited

U.S. PATENT DOCUMENTS

| | | | |
|---|---|---|---|
| 5,960,170 A * | 9/1999 | Chen et al. ............... | 714/38 |
| 6,067,410 A * | 5/2000 | Nachenberg ............... | 703/28 |
| 6,088,803 A | 7/2000 | Tso et al. | |
| 6,094,731 A * | 7/2000 | Waldin et al. ............ | 714/38 |
| 6,266,774 B1 * | 7/2001 | Sampath et al. ........... | 726/24 |
| 6,357,008 B1 * | 3/2002 | Nachenberg ............... | 726/24 |
| 6,611,925 B1 * | 8/2003 | Spear ..................... | 714/38 |
| 6,721,721 B1 * | 4/2004 | Bates et al. .............. | 707/1 |
| 6,775,780 B1 * | 8/2004 | Muttik ................... | 726/24 |
| 6,898,715 B1 * | 5/2005 | Smithson et al. ........... | 726/24 |
| 2002/0169982 A1 * | 11/2002 | Brock et al. .............. | 713/201 |
| 2003/0191957 A1 * | 10/2003 | Hypponen et al. ......... | 713/200 |

OTHER PUBLICATIONS

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc_pelican.html.
Szor, "The New 32-bit Medusa," Virus Bulletin, Dec. 2000, ISSN 0956-09979, 4 pages.
PCT International Search Report, International Application No. PCT/US03/16445, Sep. 10, 2003, 4 pages.

* cited by examiner

*Primary Examiner*—Christopher Revak
*Assistant Examiner*—Trang Doan
(74) *Attorney, Agent, or Firm*—Fenwick & West LLP

(57) ABSTRACT

Virus detection modules (120) execute virus detection techniques on clients (110) to check for the presence of computer viruses in data and also communicate with a software server (116). A constraints module (320) specifies constraints on the application of certain virus detection techniques. An administrator uses the software server (116) to release (514) a virus detection technique and an associated constraint to the clients (110). The clients (110) execute the technique subject to the constraint, and report the results to the software server (116). The administrator uses the constraint and reported results to determine (518) whether the technique is causing false positive virus detections. If necessary, the administrator modifies (520) the technique to reduce the false positives and/or modifies (524) the constraint to cause the technique to execute more frequently. The constraints allow the administrator to detect false positives without inconveniencing most clients (110).

40 Claims, 5 Drawing Sheets

REDUCING FALSE POSITIVE COMPUTER VIRUS DETECTIONS

BACKGROUND OF THE INVENTION

1. Field of the Invention

This invention pertains in general to detecting computer viruses in a computer system and in particular to reducing the number of false positive virus detections.

2. Background Art

Modern computer systems are under constant threat of attack from computer viruses and other malicious code. Viruses often spread through the traditional route: a computer user inserts a disk or other medium infected with a virus into a computer system. The virus infects the computer system when data on the disk are accessed.

Viruses also spread through new routes. A greater number of computer systems are connected to the Internet and other communications networks than ever before. These networks allow a computer to access a wide range of programs and data, but also provide a multitude of new avenues with which a computer virus can infect the computer. For example, a virus can be downloaded to a computer as an executable program, as an email attachment, as malicious code on a web page, etc. Moreover, a virus can use more sophisticated means, such as a buffer overflow attack, to infect a computer system.

Accordingly, it is common practice to install anti-virus software on computer systems. The anti-virus software monitors for the presence of a virus, and triggers an alert or performs another action if it detects a virus. Since new viruses are constantly being produced, vendors of anti-virus software provide frequent software updates in order to provide effective virus detection.

A delay in detecting the presence of a virus can cause a tremendous amount of damage and lost productivity. Therefore, anti-virus software vendors deploy software updates as quickly as possible. The updates may generate false positives because it is practically impossible for the vendor to test the virus detection techniques in the software updates against all legitimate files and other configurations of data that may be present on the customers' computers.

The vendor can take certain steps to reduce false positives. For example, the vendor can perform a public beta or other external test before releasing software updates on a wide scale. However, customers are often reluctant to adequately test the new software. For example, a customer having a large number of computer systems may be reluctant to install unproven technologies on the systems. The vendor can also perform more comprehensive internal testing of the software updates. However, this testing does not completely eliminate the risk of false positives and the resulting delay may place the vendor at a competitive disadvantage. As a result, vendors occasionally release software updates that cause a large number of false positive virus detections.

Therefore, there is a desire in the art to reduce the occurrence of false positive computer virus detections. Preferably, a solution meeting this desire will allow a vendor to release a software update for detecting new viruses while reducing the risk that the software update will trigger a large number of false positives. The solution will also preferably allow the vendor to quickly determine and eliminate any causes of false positives.

DISCLOSURE OF INVENTION

The above desire is met by providing functionality in the client computer systems (110) to deterministically evaluate constraints on uses of virus detection techniques and provide feedback to the vendor or other administrator indicating whether the techniques detected viruses. The administrator uses this functionality to release (514) a new virus detection technique to all of the clients (110), but limit use of the technique to only certain clients and/or data. The administrator collects (518) feedback and determines whether the technique is generating false positive virus detections. If so, the administrator preferably modifies (520) the technique and re-releases it to the clients (110). Once the virus detection technique is ready for wide release, the administrator preferably modifies (524) the constraints to cause the technique to execute on a larger subset (or all) of the clients (110).

In one embodiment, the administrator operates a software server (116) in communication with the clients (110) via the Internet (112). The administrator uses the software server (116) to provide virus detection techniques and optional associated constraints to the clients (110). The software server (116) also collects feedback from the clients (110).

Each client (110) preferably executes a virus detection module (120) having a scanning engine module (the "scanning module") 310 and an update module 324. The scanning module (310) preferably includes a responsive detection module (312) for implementing virus detection techniques for detecting known viruses and a heuristic detection module (316) for implementing virus detection techniques for detecting unknown viruses. The scanning module (310) performs the virus detection techniques on data at the client (110).

A constraints module (320) in the scanning module 310 preferably stores constraints received from the software server (116). In one embodiment, the constraints limit virus detection techniques to execute on only a bound subset of the clients (110), on only a bound subset of data (e.g., files) at the client, and/or on only a fixed subset of data at the client. The scanning module (310) preferably uses the constraints to determine whether to execute one or more of the virus detection techniques in the responsive (312) and/or heuristic (316) detection modules.

The update module (324) downloads the virus detection techniques and constraints, as well as other software updates, from the software server (116) and also preferably provides feedback to the software server indicating results of the constrained virus detection techniques.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
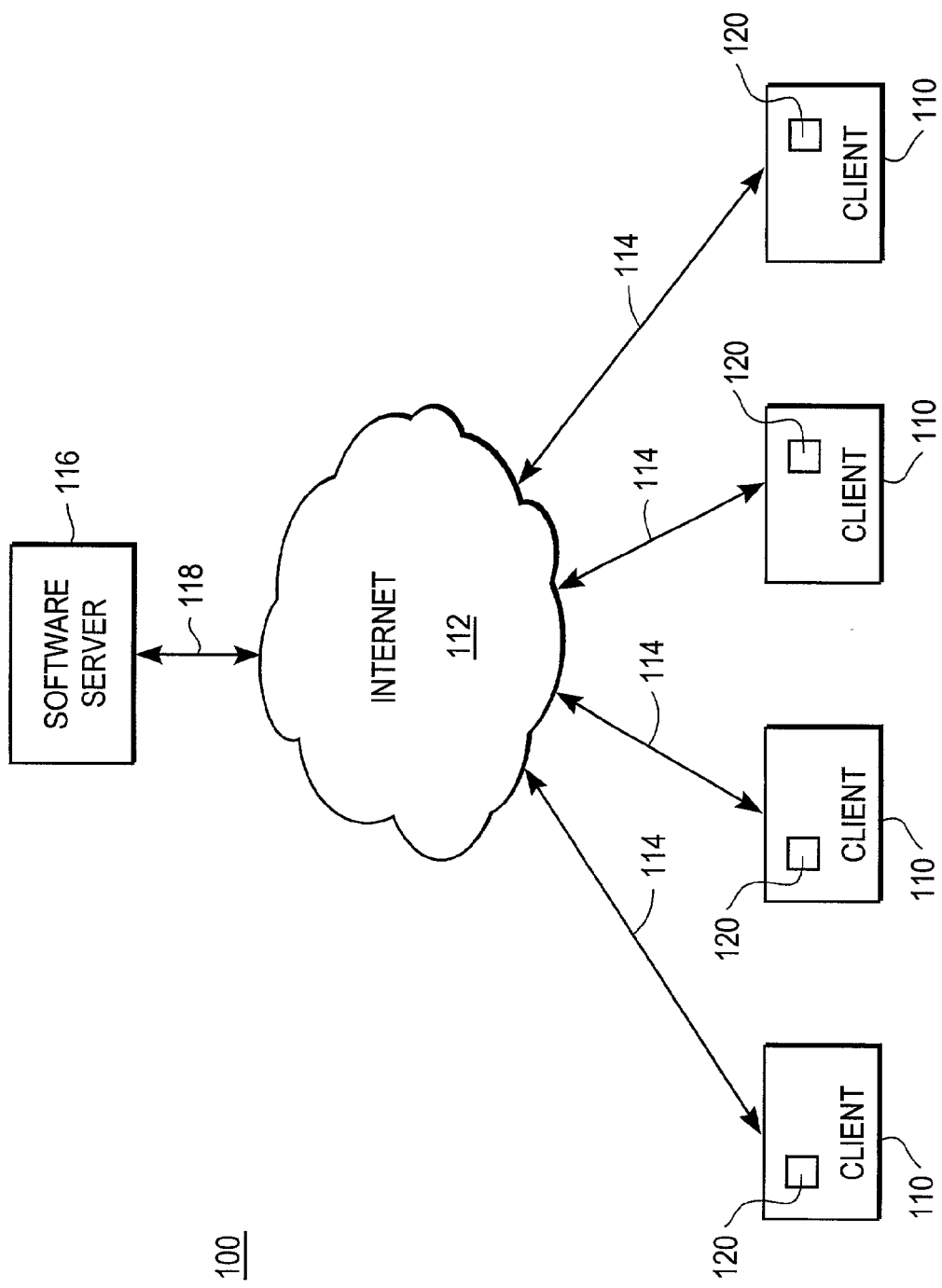
FIG. 1 is a high-level block diagram illustrating a computing environment 100 according to an embodiment of the present invention.

FIG. 1 is a high-level block diagram illustrating a computing environment 100 according to an embodiment of the present invention. Multiple client computers 110 are in communication with the Internet 112 or other network via communications links 114. A software server 116 is also connected to the Internet 112 via a communications link 118.

In one embodiment, the clients 110 are conventional computer systems. In alternative embodiments, one or more of the clients 110 are different electronic devices having Internet connectivity, such as Internet-enabled televisions, cellular telephones, personal digital assistants (PDAs), web browsing appliances, etc. Although only four clients 110 are shown in FIG. 1, embodiments of the present invention may involve thousands or millions of clients.

As is known in the art, the clients 110 preferably execute an operating system and one or more application programs. The operating system controls the operation of the computer system. In one embodiment, possible operating systems include MICROSOFT WINDOWS XP, APPLE OS X, LINUX, and variations thereof. Application programs can enable a wide variety of tasks to be performed on the computer system, including, for example, word processing, sending and receiving email, browsing the World Wide Web, etc.

Preferably each client 110 executes a virus detection module 120 for detecting the presence of a virus on the client. In one embodiment, the virus detection module 120 is a discrete application program. In another embodiment, the virus detection module 120 is integrated into another application program or the client's operating system. In one embodiment, the virus detection module 120 is configured to execute and monitor the client 110 at all times when the client is active. In another embodiment, the virus detection module 120 is adapted to check for viruses in response to a specific command from a user of the client 110.

As used herein, the terms "computer virus" and "virus" refer to any program, module, or piece of code that is loaded onto a client 110 without the user's knowledge and/or against the user's wishes. The term "virus" includes Trojan Horse programs, worms, and other such insidious software. A virus may include the ability to replicate itself and compromise other computer systems. For example, a virus may attach itself to files stored by the client 110, or use the Internet 112 to infect other clients through password cracking, buffer overflow attacks, email distribution, etc. However, a virus may lack the ability to self-replicate.

In FIG. 1, each client 110 is connected to the Internet via a communications link 114. Preferably, the communications link 114 utilizes conventional networking technology. For example, in one embodiment a client 110 uses a modem to connect over standard telephone lines with an Internet Service Provider (ISP) having a high-speed connection to the Internet 112. In another embodiment, a client 110 uses a digital subscriber line (DSL) or cable modem to access the ISP via a telephone line or cable television line, respectively. In yet another embodiment, the client 110 uses a network card and Ethernet connection to directly connect to the Internet 112. Thus, many different types of technology can be used to provide the functionality of the communications link 114.

As known in the art, the Internet is a large, publicly-accessible network of networks. Individual computers and other devices can utilize communications protocols such as the transmission control protocol/Internet protocol (TCP/IP) to send messages to other computers on the Internet. These messages can use protocols such as the hypertext transport protocol (HTTP), file transfer protocol (FTP), and simple mail transport protocol (SMTP) and data representations such as the hypertext markup language (HTML) and extensible markup language (XML) to carry and exchange information. Embodiments of the present invention may use other communications protocols and languages to exchange data.

Another communications link 118 preferably connects the software server 116 to the Internet 112. This communications link 118 is generally the same as the communications links 114 connecting the clients 110 to the Internet 112, although it may have greater bandwidth and/or fault-tolerance capabilities. Although only one software server 116 and associated communications link 118 are shown in FIG. 1, embodiments of the present invention may have multiple servers and/or links.

The software server 116 is preferably a conventional computer system 116 and preferably uses the communications links 114, 118 and Internet 112 to communicate with the virus detection modules 120 in the clients 110. In alternative embodiments of the present invention, the software server 116 and clients may communicate using alternative techniques. For example, the server 116 and clients 110 may connect via direct modem or Ethernet connections that bypass the Internet 112. In another example, server 116 may communicate with the clients 110 via physical transportation of a computer-readable media, e.g., a CD having software from the software server may be inserted into a reader at a client and executed.

The software server 116 is preferably operated by an administrator of the virus detection module 120. As used herein, the term "administrator" refers to an entity that vends, produces, controls, maintains, develops, updates or is otherwise related to the virus detection module 120. The administrator preferably uses the software server 116 to vend virus detection modules 120 to the clients 110, to update and control the behaviors of the modules, and to optionally receive feedback from the clients. In some embodiments of the present invention, the software server may lack one or more functionalities traditionally associated with a server. For example, a device that "pushes" information directly to the client may lack functionality for serving data in response to requests from clients. Therefore, the term "software server" is intended to cover any entity enabling the functionality described herein.

Figure 2:
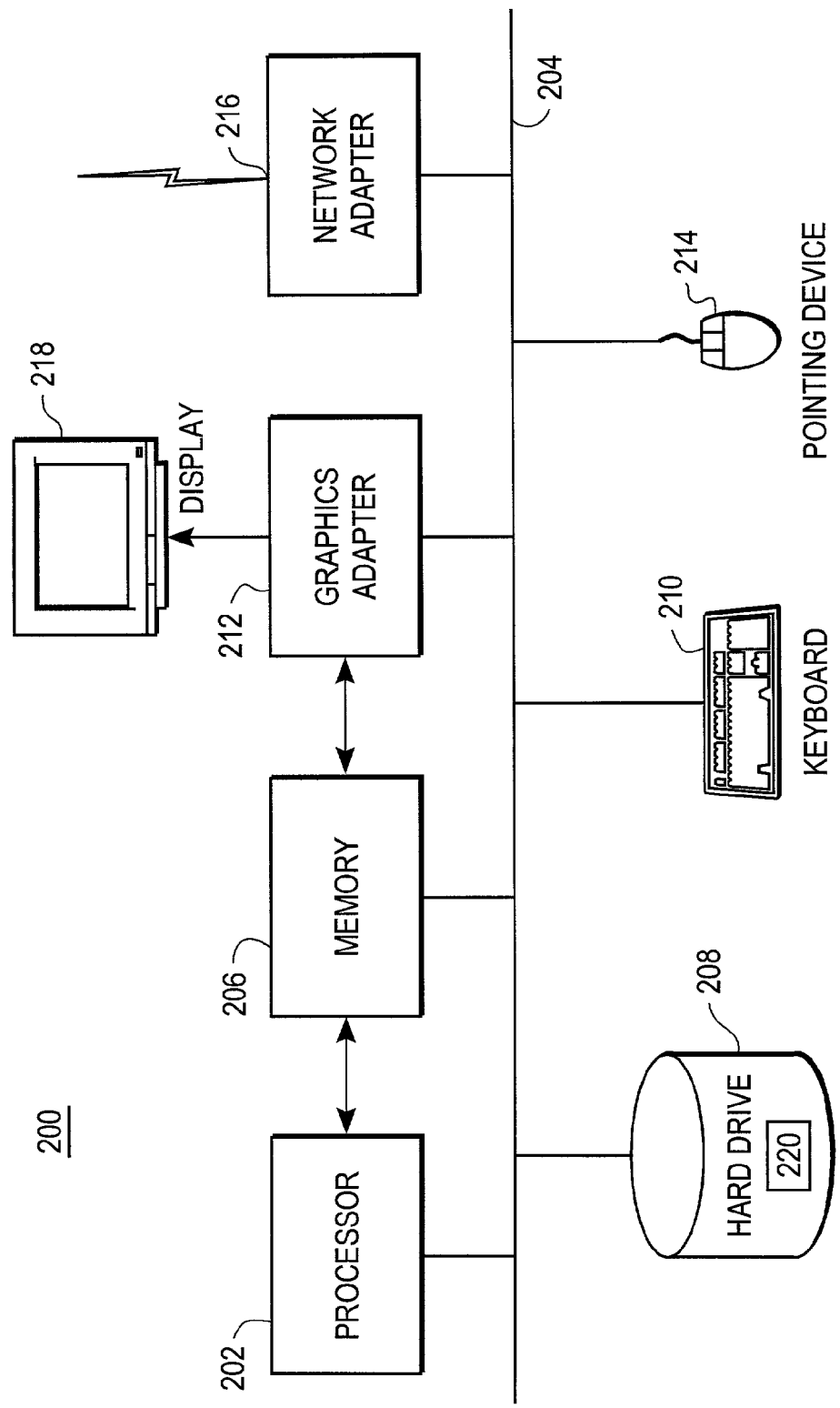
FIG. 2 is a high-level block diagram illustrating a computer system 200 for use as a client 110 according to an embodiment of the present invention.

FIG. 2 is a high-level block diagram of a computer system 200 for use as a client 110 and/or the software server 116 according to one embodiment of the present invention. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The at least one processor 202 may be any specific or general-purpose processor such as an INTEL x86 or POWERPC-compatible central processing unit (CPU). The storage device 208 may be any device capable of holding large amounts of data, like a hard drive, compact disk read-only memory (CD-ROM), DVD, or some other form of fixed or removable storage device. As is known in the art, data on the storage device 208 are generally organized into files.

The memory 206 holds instructions and data for use by the processor 202. The pointing device 214 may be a mouse, track ball, light pen, touch-sensitive display, or other type of pointing device and is used in combination with the keyboard 210 to input data into the computer system 200. The network adapter 216 couples the computer system 200 to the communications link 114, 118.

The types of hardware and software within the computer system 200 may vary. For example, the computer system utilized as the software server 116 is likely to have greater processing power than a computer system utilized as a client 110. Similarly, a client 110 may lack one or more of the devices described above if the client is a PDA, cellular phone, or other portable electronic device.

Program modules 220 for providing functionality to the computer system 200 are preferably stored on the storage device 208, loaded into the memory 206, and executed by the processor 202. Alternatively, hardware or software modules may be stored elsewhere within the computer system 200. As used herein, the term "module" refers to computer program logic and/or any hardware or circuitry utilized to provide the functionality attributed to the module. Thus, a module can be implemented in hardware, firmware, and/or software.

Figure 3:
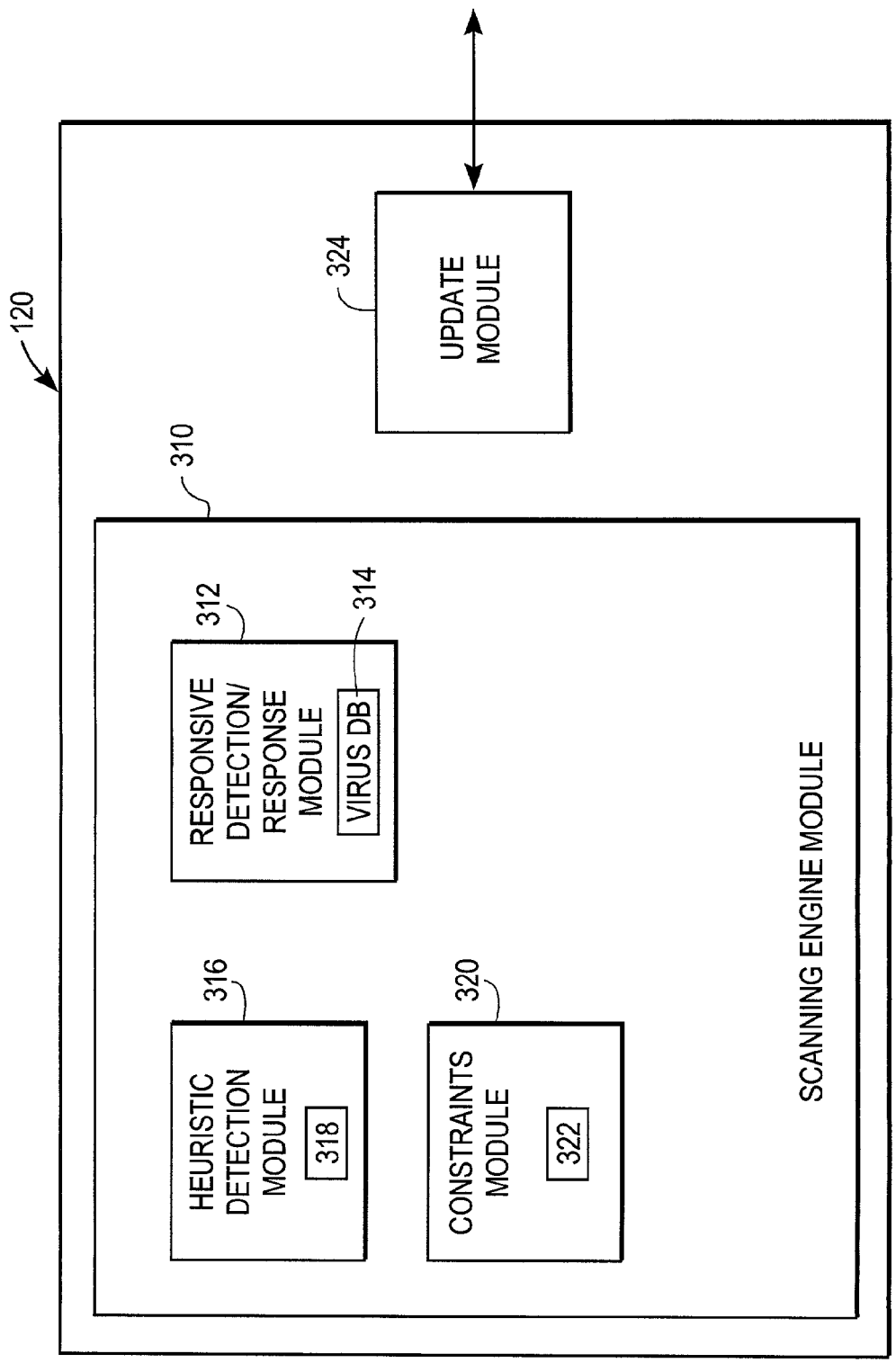
FIG. 3 is a high-level block diagram illustrating modules within the virus detection module 120 according to an embodiment of the present invention.

FIG. 3 is a high-level block diagram illustrating modules within the virus detection module 120 according to an embodiment of the present invention. A scanning engine module 310 (the "scanning module") identifies data to be checked for the presence of viruses, checks for the viruses, and, if necessary, responds to a detected virus. For the most part, the data to be checked reside in either the storage device 208 or the memory 206. The scanning module 310, therefore, identifies particular files and/or memory locations to be checked for viruses. Other data that may be identified by the scanning module 310 include emails received or sent by the client 110, streaming data received from the Internet 112, etc.

The scanning module 310 preferably includes a responsive detection module 312 holding instructions and data for detecting known viruses. Preferably, the responsive detection module 312 includes a virus database 314 holding virus profiles describing characteristics of known viruses. In one embodiment, a virus profile includes a pattern or patterns of instructions that identify the virus, information about the infection characteristics of the virus, such as whether it is memory-resident, encrypted, polymorphic, etc., the name of the virus, etc. In general, each virus profile in the database 314 is determined by human analysts who study the virus's behaviors and identify the mechanisms that can be used to detect it.

The responsive detection module 312 also preferably holds instructions and data for responding to detected viruses. In one embodiment, the responsive detection module 312 supports multiple response options depending upon the type of virus, how the module is configured, etc. In one embodiment, potential responses include attempting to repair the data infected by the virus, quarantining the data to prevent the virus from spreading, displaying a visual and/or audible alert to a user indicating that a virus was detected, and/or deleting the infected data. In one embodiment, the virus profiles in the virus database 314 include instructions for repairing files or other data infected by the viruses.

The scanning module 310 preferably also includes a heuristic detection module 318 holding instructions and data for detecting unknown viruses. Preferably, the heuristic detection module 316 includes a heuristics catalog 318 holding the various heuristics that may be utilized to detect the presence of a virus. There are many heuristics that may indicate the presence of a virus. For example, the presence of certain character strings, such as "ha ha" or "virus" in a file may suggest the presence of a virus. In addition, a program that writes to certain files that are automatically replicated by other programs, such as MICROSOFT WORD's "normal.dot" file, may contain a virus. Likewise, a program that patches its own entry point, or executes in a memory area normally reserved for data, may contain a virus. Depending upon the embodiment of the present invention, the heuristics catalog 318 preferably contains these and/or other heuristics for detecting unknown viruses.

In one embodiment, the heuristics in the heuristics catalog 318 are organized as a series of rules and a control program that executes the rules. For example, one of the rules may query whether a file contains the character string "virus" and another rule may query whether the file writes to "normal.dot." Each rule preferably generates a result when executed. In one embodiment, possible result types include binary values, text strings, weights, etc.

The control program preferably executes (or does not execute) certain rules in order to detect the presence of a virus. The control program preferably executes initial rules, and then uses the responses of those rules to determine whether to execute additional rules and/or declare whether a virus is detected. For example, the control program may execute a chain of rules and then weigh the results to determine whether a file contains a virus. In another embodiment, rules are set to execute automatically, but each rule "asks" the control program whether it should execute before it does so. In this manner, the control program is able to selectively disable certain rules.

In one embodiment, the control program is expressed in an intermediate-level programming language called "p-code." In general, p-code specifies program instructions for a virtual machine. The heuristic detection module 316 preferably executes the p-code by either interpreting the instructions or compiling the instructions into native client machine code.

The virus detection methodologies implemented by the responsive 312 and heuristic 316 detection modules are collectively referred to herein as "virus detection techniques." The scanning module 310 preferably contains instructions and data for applying the virus detection techniques. Generally, it is more efficient to eliminate known viruses from consideration before searching for unknown viruses. Thus, the scanning module 310 preferably employs responsive detection techniques before employing heuristic detection techniques.

The scanning module 310 is so named because one of its primary functions is scanning data for the virus patterns in the virus database 314. However, it should be understood that the scanning module 310 preferably performs virus detection techniques besides scanning, such as executing code in an emulator and applying the heuristics. In alternative embodiments of the present invention, the scanning module 310 does not perform any "scanning" and instead utilizes other virus detection techniques.

A constraints module 320 in the scanning module 310 preferably specifies constraints on the virus detection techniques. In general, the constraints specify whether the scanning module 310 should utilize a particular technique or techniques to check data for a virus. The constraints may be applied at any desired level of granularity. For example, the constraints can specify that a particular virus profile, or group of virus profiles, should not be utilized. Likewise, the constraints can specify that particular heuristic or class of heuristics should not be utilized. The constraints can also selectively disable either of the detection modules 312, 316.

In one embodiment, the constraints in the constraints module 320 fall into one of three different categories: (1) constraints that limit a virus detection technique to a bound subset of clients 110; (2) constraints that limit a virus detection technique to a bound subset of data; and (3) constraints that limit a virus detection technique to a fixed subset of data. Preferably, the constraints are deterministic, i.e., a constraint will always evaluate the same when acting on a given virus detection technique on a given client 110 for given data. Alternative embodiments of the present invention may utilize non-deterministic constraints, and/or constraints that do not fall into the categories outlined above. Multiple constraints of different (or the same) types can be combined.

Constraints that limit a virus detection technique to a bound subset of clients preferably utilize one or more attributes of a client 110 to determine whether a virus detection technique should be applied to data. In one embodiment, the constraints module 320 determines an identification for the client 110 (the "client ID") based on the client's attributes, and then evaluates the client ID against the constraint to determine whether to use the technique.

In one embodiment, the client attributes that may be utilized to form the client ID include the client's volume serial number string, network adapter 216 MAC address string, CD-ROM drive hardware identification string, graphics adapter 212 hardware identification string, CPU 202 serial number string, hard drive hardware identification string, SCSI host adapter hardware identification string, IDE controller hardware identification string, processor model string, RAM size, operating system, computer name, etc. A client attribute can also be based on information held in the virus detection module 120 itself (or other modules present in the client 110). For example, the serial or registration number of the virus detection module 120 can be utilized as an attribute.

Constraints that limit a virus detection technique to a bound subset of data preferably utilize a data identification ("data ID") derived from one or more attributes of the data to determine whether a virus detection technique should be utilized on those data. For example, if the data are contained in a file on the storage device 208, the constraints module 320 can form the data ID from file attributes including the file name (either with or without the path), the path to the file, the size of the file, the file extension, a date associated with the file, a checksum of the file, etc.

The constraints module 320 preferably generates a numerical value from the client and/or data ID, normalizes the value to within a fixed range, and then compares the numerical value with a threshold specified by the constraint. If the ID evaluates to less than the threshold, the virus detection technique is applied to the data. In one embodiment, the constraints module 320 uses a hashing algorithm such as MD5 to generate the numerical value from the ID and then normalizes the numerical value between zero and one. Thus, the constraints module 320 preferably acts as follows on bound constraints:

if (normalize (hash (ID))<THRESHOLD)
    then apply virus detection technique, where "ID" is the client and/or data ID and "THRESHOLD" is specified by the constraint.

For constraints that limit a virus detection technique to a fixed subset of data, the constraints module 320 preferably utilizes a predetermined database 322 that specifies whether certain techniques should be applied to certain data. In the embodiment where the data are organized into files, the predetermined database 322 preferably identifies the files to check for the presence of a virus (or files to exclude from checking). In another embodiment, the database 322 identifies techniques to utilize on certain files (or to not utilize on certain files). In one embodiment, the identifications are hashes derived from the names of the files. In this embodiment, the constraints module 320 hashes a file name provided by the security module 310, determines whether the hash is in the predetermined database 322, and, if so, checks the file for the presence of a virus.

An update module 324 in the virus detection module 120 preferably contains instructions and data for interfacing with the software server 116. In a preferred embodiment, the update module 324 downloads instructions and data updating the operation of the virus detection module 120. In one embodiment, the update module 324 also reports information about the operation of the virus detection module 120 to the software server 116, such as the number and types of viruses detected at the client 110, the technique that triggered the detection, and the data in which the virus was detected.

In one embodiment, the update module 324 provides the software server 116 with data identifying the versions of the instructions and data installed in the virus detection module 120. The software server 116 determines from the current versions whether updates to one or more of the instructions and/or data are available and, if so, downloads the updates to the client 110. In another embodiment, the software server 116 provides a list of the current versions of the instructions and/or data to the update module 324, and the update module reviews the list to determine whether to download the updates.

In one embodiment, the update module 324 can download updated versions of the virus database 314, heuristics catalog 318, heuristics detection module control program, and/or constraints module 320. The update module 324 can also download updated versions of itself and other aspects of the scanning module 310. The update module 324 installs the updates into the virus detection module 120.

Preferably, it is rarely necessary to update the executable code in the modules because the operation of the virus detection module 120 is substantially data-driven. That is, many of the virus detection behaviors implemented by the module 120 are performed in response to data and, therefore, the behaviors can be changed by changing the data. For example, the behavior of the responsive detection module 312 can be altered by adding or removing virus profiles in the virus database 314. Similarly, the rules in the heuristics catalog 318 can be changed in order to change the behavior of the heuristics detection module 316. The control program can likewise be changed. In addition, the virus detection techniques utilized by the scanning module 310 can be controlled through the constraints specified in the constraints module 320.

Those of skill in the art will recognize that the modules and functionality described with respect to FIG. 3 may vary in alternative embodiments of the present invention. The various modules may be combined and/or the functionality of the modules may be distributed among the modules differently. In addition, alternative embodiments may lack one or more of the modules described herein and/or contain different modules. For example, in one embodiment the functionality of the constraints module 320 is incorporated into the heuristic detection 316 and/or responsive detection 312 modules.

Figure 4:
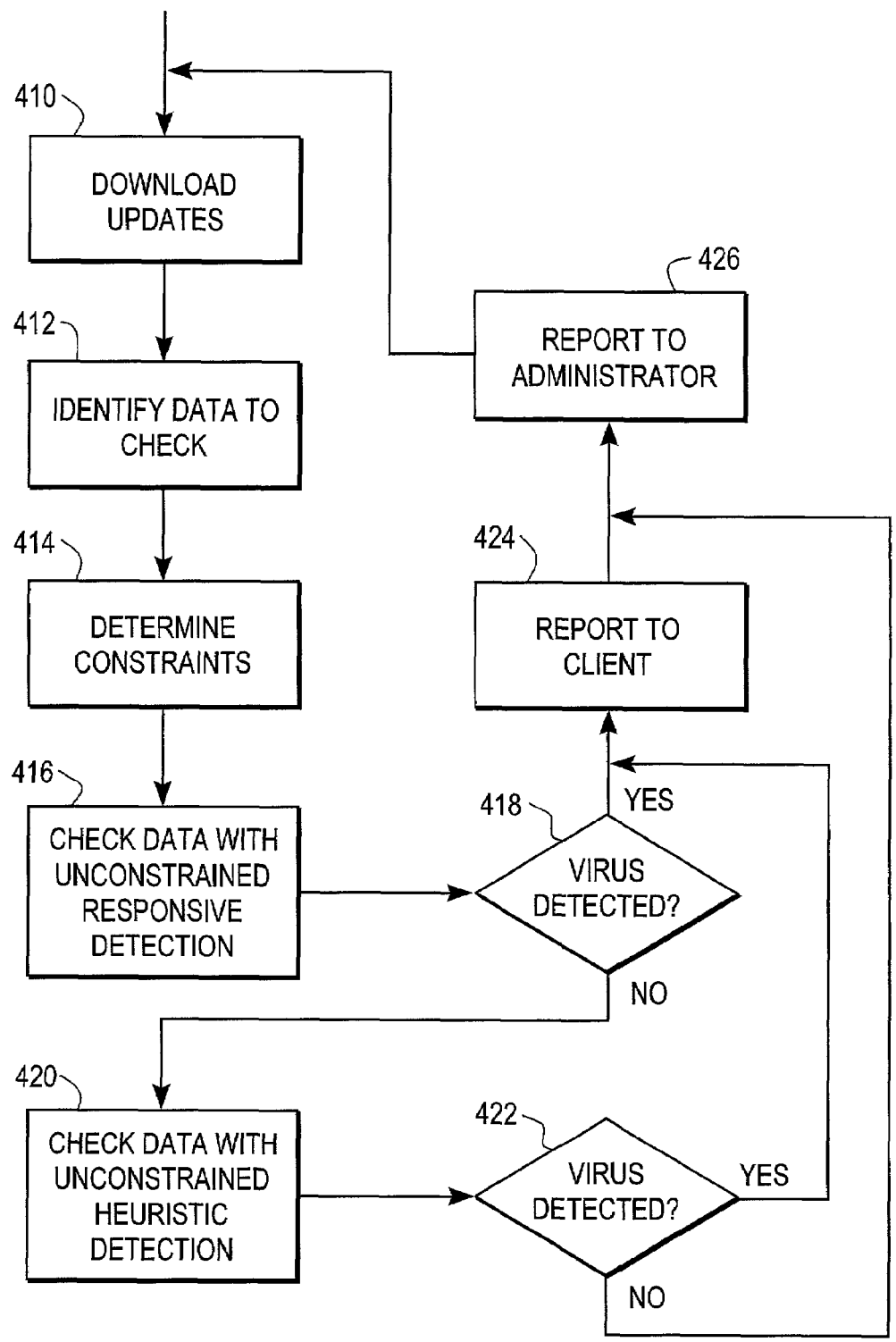
FIG. 4 is a flow chart illustrating the operation of the virus detection module 120 according to an embodiment of the present invention.

FIG. 4 is a flow chart illustrating the operation of the virus detection module 120 according to an embodiment of the present invention. Different embodiments of the virus detection module 120 may perform the illustrated steps in different orders, omit certain steps, and/or perform additional steps not shown in FIG. 4.

The virus detection module 120 downloads 410 an update from the software server 116. The update includes a new virus detection technique, such as a new virus profile and/or heuristic, and optionally specifies constraints on the virus detection technique. In one embodiment, the virus detection technique and constraints are installed at the client 110 at the same time as the virus detection module 120, or are installed through a mechanism other than downloading.

At some point during operation, the virus detection module 120 identifies 412 data, such as a file, to check for the presence of a virus. The virus detection module 120 determines 414 whether there are any constraints that apply to checking the data. As part of this step, the virus detection module 120 may determine the client ID and/or data ID, and evaluate the IDs against one or more thresholds. Depending upon the result of the evaluation, the virus detection module 120 may determine not to utilize one or more virus detection techniques.

The virus detection module 120 preferably utilizes the non-constrained responsive virus detection techniques to check 416 the identified data for the presence of a virus. If it is determined at step 418 that the responsive techniques do not detect a virus, the module 120 preferably utilizes the non-constrained heuristic virus detection techniques to check 420 for a virus. If it is determined at step 418 or step 422 that either set of techniques identifies a virus, the virus detection module 120 preferably reports at step 424 this result to the user of the client 110. The user can then instruct the virus detection module 120 to quarantine the data, clean the virus from the data, etc.

Contemporaneously with the reporting to the user, the virus detection module 120 preferably reports 426 the results of the virus detection techniques to the administrator via the software server 116. In one embodiment, the virus detection module 120 reports all virus detections. In another embodiment, the software server 116 provides the virus detection module 120 with data indicating which detection techniques to track and report on. In one embodiment, the virus detection module 120 initiates a connection with the software server 116 upon the detection of a virus. In another embodiment, the virus detection module 120 accumulates an activity log, and then transfers the log to the software server 116 the next time a connection is made between the two.

Preferably, the report provided by the virus detection module 120 to the administrator specifies the data infected by the virus and the techniques that detected the infection. For example, a report can include a file's name, size, path, etc. and identify the specific virus profile or heuristic that triggered the virus detection. Different embodiments of the virus detection module 120 report additional and/or different information to the administrator.

Figure 5:
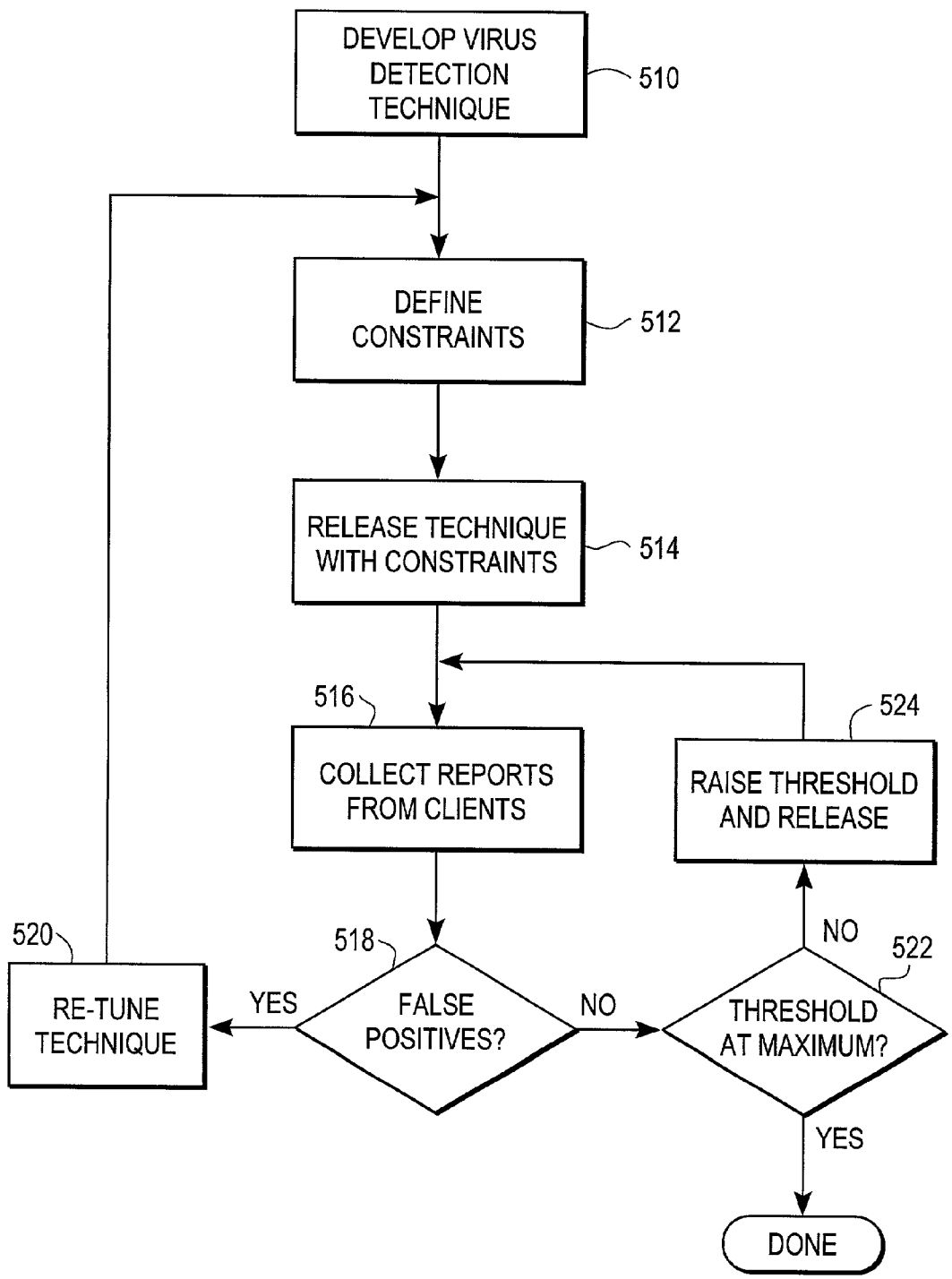
FIG. 5 is a flow chart illustrating steps for reducing occurrences of false positive virus detections according to an embodiment of the present invention.

FIG. 5 is a flow chart illustrating steps for reducing occurrences of false positive virus detections according to an embodiment of the present invention. Different embodiments of the present invention may perform the illustrated steps in different orders, omit certain steps, and/or perform additional steps not shown.

Initially, analysts affiliated with the administrator develop 510 a virus detection technique. The analysts also define 512 a set of constraints for the technique. For example, the analysts may define a set of constraints that causes the technique to be applied to only files that are likely to be infected by a virus, to only 10% of the files on any given client 110, and/or on only 10% of the clients.

The virus detection technique and set of constraints are released 514 by the software server 116 to the virus detection modules 120 at the clients 110. The clients 110 are also instructed to report back on the results of the technique. The clients 110 execute the virus detection technique subject to the constraints, and the server 116 collects 516 reports about the executions from the clients. This collection 516 preferably happens in an automated fashion as described above. In alternative embodiments, however, the collection may occur using manual techniques. For example, the user of the client can call or email the administrator and verbally report the results of the technique.

The analysts analyze the reports from the clients 110 and determine 518 whether the virus detection technique results in an unacceptable number of false positives. For example, the analysts may discover that a particular sequence of instructions matches a virus but also matches a legitimate application program and, therefore, generates a large number of false positives. Similarly, the analysts may discover that a particular heuristic correctly identifies certain viruses, but also generates false positives when users perform certain tasks.

Judicious use of constraints limits the number of clients 110 that will suffer the false positives. For example, if a virus detection technique causes a false positive 20% of the time during normal operation of the clients 110, but the technique is constrained to execute on only 10% of the clients, only 2% of the clients will actually experience the false positive. Therefore, the analysts can learn of high false positive rates without inconveniencing the vast majority of the clients 110.

In the event that a virus detection technique generates an unacceptable number of false positives, the analysts preferably re-tune 520 the technique. For example, the analysts may change a heuristic or modify an instruction pattern. Although not shown in FIG. 5, the analysts can also adjust the constraints at this time. Then, the analysts preferably release 514 the re-tuned technique to the clients.

If the virus detection technique does not generate an unacceptable number of false positives, the analysts preferably adjust the constraints to make a greater number of clients 110 apply the technique, and/or make the clients apply the technique against a greater number of files or other data. Preferably, this adjustment is performed by raising 524 the threshold against which the constraints are evaluated. In an alternative embodiment, the adjustment can be performed by eliminating or redefining the constraints. The adjusted constraints are released 524 to the clients 110.

Preferably, the process of collecting feedback 516, retuning 520 the technique, and/or raising 524 the threshold is repeated as many times as desired. Eventually, the analysts either remove the constraints, or raise the thresholds to the maximum (thereby effectively removing the constraints). At this point, the virus detection technique executes on all of the clients 110 and causes a minimum of false positives.

Thus, the use of constraints according to the present invention allows the administrator to release new responsive and heuristic virus detection techniques sooner, without fear that the previously-untried techniques will produce rampant false positives. The present invention also allows new and previously unknown viruses to be detected and identified more quickly due to the reporting performed by the clients 110.

The present invention is applicable to fields beyond virus prevention and detection. The constraints module 320 is useful in any situation where an administrator is releasing new or updated software to multiple clients 110 but desires to limit execution of the software in order to reduce potential problems. In this situation, the administrator uses the constraints module 320 to limit the software's execution and uses the software server 116 to monitor the clients. If the software is causing excessive problems at the clients 110 on which it is executing, the administrator preferably revises the software and/or constraints and re-releases it. Thus, the present invention is application to general software releases as well as to releases of virus detection techniques.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer program product for detecting computer viruses on a computer system in communication with a software server via a network, the computer program product comprising:
    a computer-readable medium having computer program code modules embodied thereon for detecting the presence of a computer virus in data on a computer system, the computer program code modules comprising:
        a virus detection module for specifying a virus detection technique for detecting the presence of a computer virus in data;
        a constraints module for specifying a constraint on use of the virus detection technique, wherein the constraint is satisfied on a subset of computer systems that evaluate it;
        a scanning module for applying the virus detection technique to the data responsive to satisfaction of the constraint and generating virus detection results therefrom; and
        an update module for providing the virus detection results to the software server, the results comprising information from which a false positive virus detection can be determined.

2. The computer program product of claim 1, wherein the virus detection module comprises:
    a responsive detection module for storing virus detection techniques for detecting known viruses.

3. The computer program product of claim 2, wherein the responsive detection module comprises:
    a virus database module for storing virus profiles describing known viruses.

4. The computer program product of claim 1, wherein the virus detection module comprises:
    a heuristic detection module for storing virus detection techniques for detecting unknown viruses.

5. The computer program product of claim 4, wherein the heuristic detection module comprises:
    a heuristics catalog for storing a plurality of rules for detecting the presence of a virus.

6. The computer program product of claim 1, wherein the constraints module comprises:
    a constraint limiting use of the virus detection technique to a subset of data stored by a computer system executing the scanning module.

7. The computer program product of claim 6, wherein the constraints module further comprises:
    a database adapted to hold data identifying the subset of data on which the virus detection technique is to be used.

8. The computer program product of claim 1, wherein the constraint specifies a numeric threshold against which the data are evaluated.

9. The computer program product of claim 1, wherein the update module is further adapted to receive updates to modules in the computer program product from the software server.

10. The computer program product of claim 9, wherein the update module is further adapted to receive a new virus detection technique and a constraint on use of the new virus detection technique from the software server.

11. The computer program product of claim 1, wherein the update module is configured to receive an updated constraint from the software server, the constraint updated responsive to a rate of false positive virus detection on computer systems that apply the virus detection technique to data.

12. The method of claim 11, wherein the updated constraint comprises a relaxed constraint that specifies execution of the virus detection technique on an enlarged subset of the plurality of clients.

13. A computer-implemented method for providing software specifying a virus detection technique to a plurality of clients, the method comprising the steps of:
    defining a constraint that specifies execution of the virus detection technique on a subset of the plurality of clients;
    providing the constraint to the clients;
    collecting feedback from the subset of the clients that executed the virus detection technique, the feedback comprising information from which a rate of false positive virus detection resulting from execution of the virus detection technique can be determined; and
    responsive to the rate of false positive virus detection being below a threshold, relaxing the constraint so that it specifies execution of the virus detection technique on an enlarged subset of the plurality of clients.

14. The method of claim 13, further comprising the step of providing a module adapted to evaluate attributes of the client to determine whether the attributes satisfy the constraint.

15. The method of claim 13, wherein the step of defining a constraint comprises the substep of:
    defining a constraint that specifies execution of the software on a subset of data at the clients.

16. The method of claim 15, wherein the client is adapted to evaluate attributes of data at the client to determine whether to execute the software on the data.

17. The method of claim 13, wherein the step of defining a constraint comprises the substep of:
    defining a constraint that specifies execution of the software on a fixed subset of data at the clients.

18. The method of claim 17, wherein the step of defining a constraint further comprises the substeps of:
    specifying a fixed subset of data on which the clients should execute the software; and
    providing the specification of the fixed subset of data to the clients.

19. The method of claim 13, wherein the collected feedback indicates that the software is causing undesirable effects on the clients when executed, and further comprising the steps of:
  modifying the software responsive to the undesirable effects; and
  releasing the modified software to the clients.

20. The method of claim 13, wherein the constraint is specified with a threshold, and wherein a client is adapted to generate a value and compare it with the threshold in order to determine whether to execute the software.

21. The method of claim 20, wherein the value is a client ID generated responsive to attributes of the client.

22. The method of claim 20, wherein the value is a data ID generated responsive to attributes of data at the client.

23. The method of claim 13, further comprising:
  responsive to the rate of false positive virus detection being below a threshold, eliminating the constraint.

24. A method for checking for a computer virus at a client in communication with a software server via a network, comprising the steps of:
  receiving a virus detection technique from the software server, and storing it in a memory of the client, the virus detection technique adapted to identify a virus in data at the client;
  receiving a constraint on the virus detection technique from the software server, wherein the constraint is satisfied on a subset of clients that evaluate it;
  determining whether to use the virus detection technique at the client based on the constraint;
  responsive to a determination to use the virus detection technique, using the virus detection technique to check for the virus in the data and generate results therefrom; and
  providing the software server with the virus detection results, the results comprising information from which a false positive virus detection resulting from use of the virus detection technique to data at the client can be determined.

25. The method of claim 24, wherein the step of determining whether to use the virus detection technique comprises the substep of:
  evaluating attributes of the client to determine whether to execute the virus detection technique.

26. The method of claim 24, wherein the constraint limits use of the virus detection technique to a subset of data at the client.

27. The method of claim 26, wherein the step of determining whether to use the virus detection technique comprises the substep of:
  evaluating attributes of the data to determine whether to execute the virus detection technique on the data.

28. The method of claim 26, wherein the subset of data is fixed and wherein the step of determining whether to use the virus detection technique on the data comprises the substep of:
  evaluating attributes of the data against a database received from the software server, the database including information enabling the client to evaluate whether to use the virus detection technique on the data.

29. The method of claim 24, wherein the constraint comprises a client identification string.

30. The method of claim 24, wherein the constraint comprises a client address.

31. A computer system in communication with a software server over a network, the computer system having a processor and a memory for detecting the presence of a computer virus, comprising:
  a virus detection module for specifying a virus detection technique for detecting the presence of a computer virus in data stored in the memory;
  a constraints module for specifying a constraint on use of the virus detection technique, wherein the constraint is satisfied on a subset of computer systems that evaluate it;
  a scanning module for executing on the processor and applying the virus detection technique to the data responsive to satisfaction of the constraint, thereby generating virus detection results; and
  an update module for providing the virus detection results to the software server, the results comprising information from which a false positive virus detection resulting from application of the virus detection technique to data can be determined.

32. The system of claim 31, wherein the virus detection module comprises:
  a responsive detection module for storing virus detection techniques for detecting known viruses.

33. The system of claim 32, wherein the responsive detection module comprises:
  a virus database module for storing virus profiles describing known viruses.

34. The system of claim 31, wherein the virus detection module comprises:
  a heuristic detection module for storing virus detection techniques for detecting unknown viruses.

35. The system of claim 34, wherein the heuristic detection module comprises:
  a heuristics catalog for storing a plurality of rules for detecting the presence of a virus.

36. The system of claim 31, wherein the constraints module comprises:
  a constraint limiting use of the virus detection technique to a subset of data stored by a computer system executing the scanning module.

37. The system of claim 36, wherein the constraints module further comprises:
  a database adapted to hold data identifying the subset of data on which the virus detection technique is to be used.

38. The system of claim 31, wherein the constraint specifies a numeric threshold against which the data are evaluated.

39. The system of claim 31, wherein the update module is further adapted to receive updates to the modules in the system from the software server.

40. The system of claim 39, wherein the update module is further adapted to receive a new virus detection technique and a constraint on use of the new virus detection technique from the software server.

* * * * *